United States Patent
Green et al.

(10) Patent No.: US 12,307,770 B2
(45) Date of Patent: May 20, 2025

(54) METHOD FOR DETECTING AND RESPONDING TO CONDITIONS WITHIN A SPACE

(71) Applicant: VergeSense, Inc., Mountain View, CA (US)

(72) Inventors: Kelby Green, Mountain View, CA (US); Kanav Dhir, Mountain View, CA (US); Dan Ryan, Mountain View, CA (US); Damien Leostic, Mountain View, CA (US); Marine Dunoguier, Mountain View, CA (US); Habib Bukhari, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 34 days.

(21) Appl. No.: 18/134,490

(22) Filed: Apr. 13, 2023

(65) Prior Publication Data

US 2023/0334863 A1    Oct. 19, 2023

Related U.S. Application Data

(60) Provisional application No. 63/330,642, filed on Apr. 13, 2022.

(51) Int. Cl.
*G06V 20/40* (2022.01)
*G06T 7/70* (2017.01)
(Continued)

(52) U.S. Cl.
CPC ............. *G06V 20/44* (2022.01); *G06T 7/70* (2017.01); *G06V 10/255* (2022.01); *G06V 10/40* (2022.01);
(Continued)

(58) Field of Classification Search
CPC ...... G06V 20/44; G06V 10/255; G06V 10/40; G06V 20/52; G06V 20/70; G06V 10/25;
(Continued)

(56) References Cited

U.S. PATENT DOCUMENTS

| | | | |
|---|---|---|---|
| 9,380,682 B2 * | 6/2016 | Mead | H05B 47/115 |
| 2015/0359070 A1 * | 12/2015 | Mead | H05B 47/155 315/154 |

(Continued)

*Primary Examiner* — Marnie A Matt
(74) *Attorney, Agent, or Firm* — Run8 Patent Group, LLC; Peter Miller; Madison Tyrcha

(57) ABSTRACT

A method for detecting conditions within a space includes: accessing a corpus of object lists generated based on objects detected in images captured by a population of sensor blocks; compiling locations of a set of objects represented in the corpus of object lists into a map of the space based on known locations of the population of sensor blocks; accessing a nominal condition of the space defining a set of inclusion objects and a set of exclusion objects within a threshold distance of an anchor object type; and detecting the anchor object type in the map according to the nominal condition. The method further includes, in response to detecting an object within the threshold distance of the anchor object type in the map and deviating from the nominal condition: identifying the object as anomalous in the map; and generating a notification to investigate the object.

20 Claims, 5 Drawing Sheets

(51) Int. Cl.
  *G06V 10/20* (2022.01)
  *G06V 10/40* (2022.01)
  *G06V 20/52* (2022.01)
  *G06V 20/70* (2022.01)
  *G08B 23/00* (2006.01)

(52) U.S. Cl.
  CPC .............. *G06V 20/52* (2022.01); *G06V 20/70* (2022.01); *G08B 23/00* (2013.01)

(58) Field of Classification Search
  CPC .......... G06V 10/44; G06V 20/60; G06T 7/70; G06T 7/73; G08B 23/00; G06F 18/2433
  USPC ........................................................ 348/159
  See application file for complete search history.

(56) References Cited

U.S. PATENT DOCUMENTS

| | | | |
|---|---|---|---|
| 2018/0204111 A1* | 7/2018 | Zadeh .................. | G06V 10/764 |
| 2019/0392506 A1* | 12/2019 | Bogolea ............. | G06Q 30/0633 |
| 2020/0184278 A1* | 6/2020 | Zadeh .................. | G06N 3/044 |
| 2020/0184411 A1* | 6/2020 | Shah ...................... | G06V 20/52 |
| 2020/0253683 A1* | 8/2020 | Amanatullah .......... | A61B 90/06 |
| 2022/0005332 A1* | 1/2022 | Metzler ............... | G06F 18/2431 |
| 2022/0103022 A1* | 3/2022 | Bell ....................... | G06V 20/52 |
| 2022/0279316 A1* | 9/2022 | Klinkner ................ | G08B 21/24 |
| 2023/0274412 A1* | 8/2023 | Nadin Pinheiro ...... | G06T 7/001 |
| | | | 382/103 |
| 2024/0096118 A1* | 3/2024 | Eavy .................. | G06Q 30/0645 |

\* cited by examiner

METHOD FOR DETECTING AND RESPONDING TO CONDITIONS WITHIN A SPACE

CROSS-REFERENCE TO RELATED APPLICATIONS

This application claims the benefit of U.S. Provisional Application No. 63/330,642 filed on 13 Apr. 2022, which is incorporated in its entirety by this reference.

This application is related to U.S. patent application Ser. No. 15/973,445 filed on 7 May 2018, U.S. patent application Ser. No. 16/828,676 filed on 24 Mar. 2020, and U.S. patent application Ser. No. 17/033,462 filed on 25 Sep. 2020, each of which are incorporated in its entirety by this reference.

TECHNICAL FIELD

This invention relates generally to the field of workplace monitoring and more specifically to a new and useful method for detecting and responding to conditions within a space in the field of workplace monitoring.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
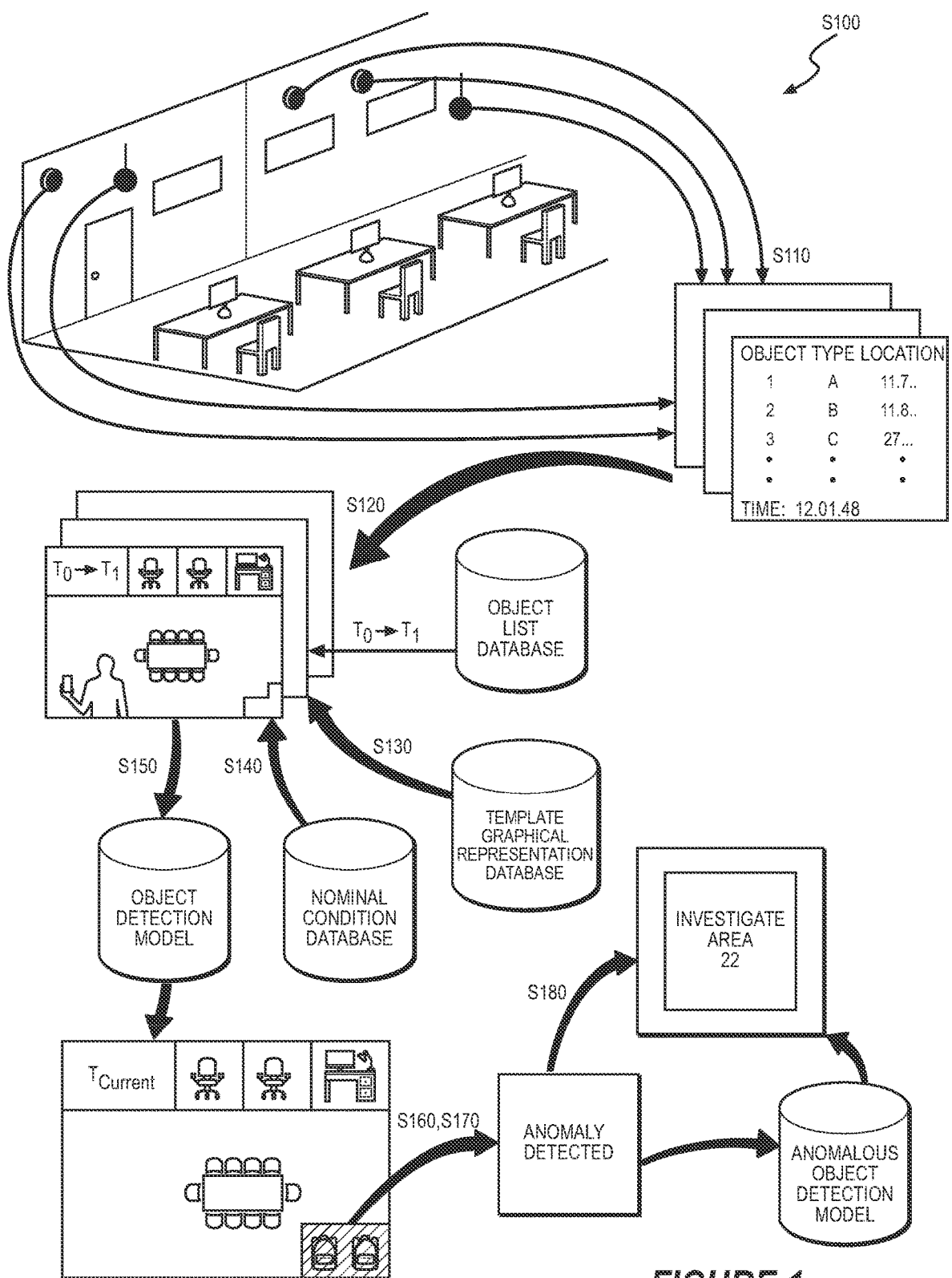
FIG. 1 is a flowchart representation of a method.

As shown in FIG. 1, a method S100 for detecting conditions within a space includes, during a first time period: accessing a corpus of object lists, each object list in the corpus of object lists generated based on objects detected in images captured by a population of sensor blocks arranged in the space in Block S110; compiling locations and object types of a first set of objects represented in the corpus of object lists into a map of the space based on known locations of the population of sensor blocks in Block S120; retrieving graphical representations of object types from a template graphical representation database; populating the map of the space with graphical representations analogous to object types of the first set of objects in Block S130; accessing a nominal condition of the space defining a set of inclusion objects within a threshold distance of an anchor object type and defining a set of exclusion objects within the threshold distance of the anchor object type and excluded from the set of inclusion objects in Block S140; and detecting the anchor object type in the map according to the nominal condition in Block S150. The method S100 also includes, in response to detecting a subset of objects, in the first set of objects, within the threshold distance of the anchor object type in the map and deviating from the set of inclusion objects and the set of exclusion objects: identifying the subset of objects, proximal a first location in the map, as anomalous in Block S160; generating a notification to investigate the first location for the subset of objects in Block S180; and transmitting the notification to a user affiliated with the space in Block S190.

Figure 2:
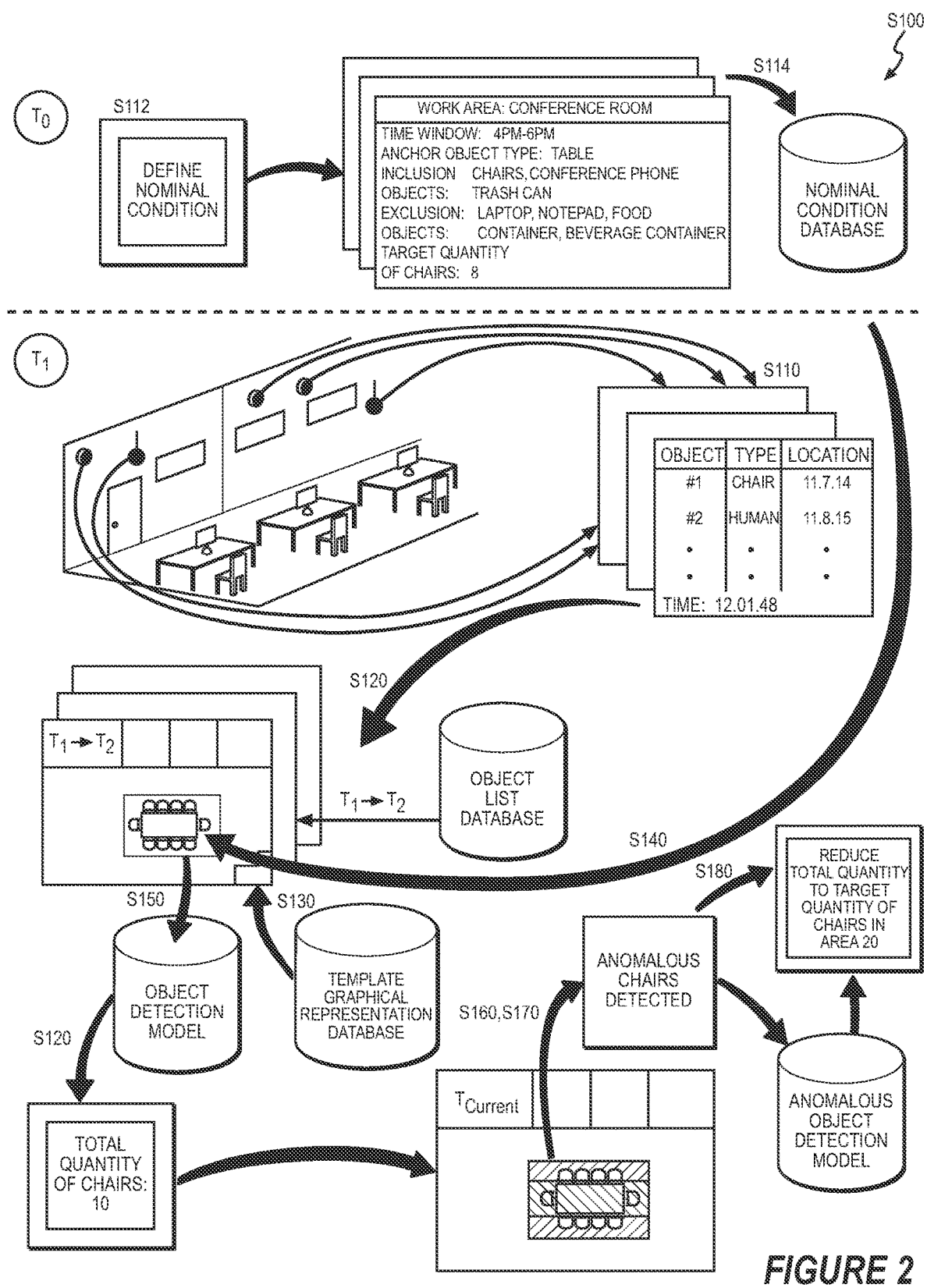
FIG. 2 is a flowchart representation of one variation of the method.
Figure 3:
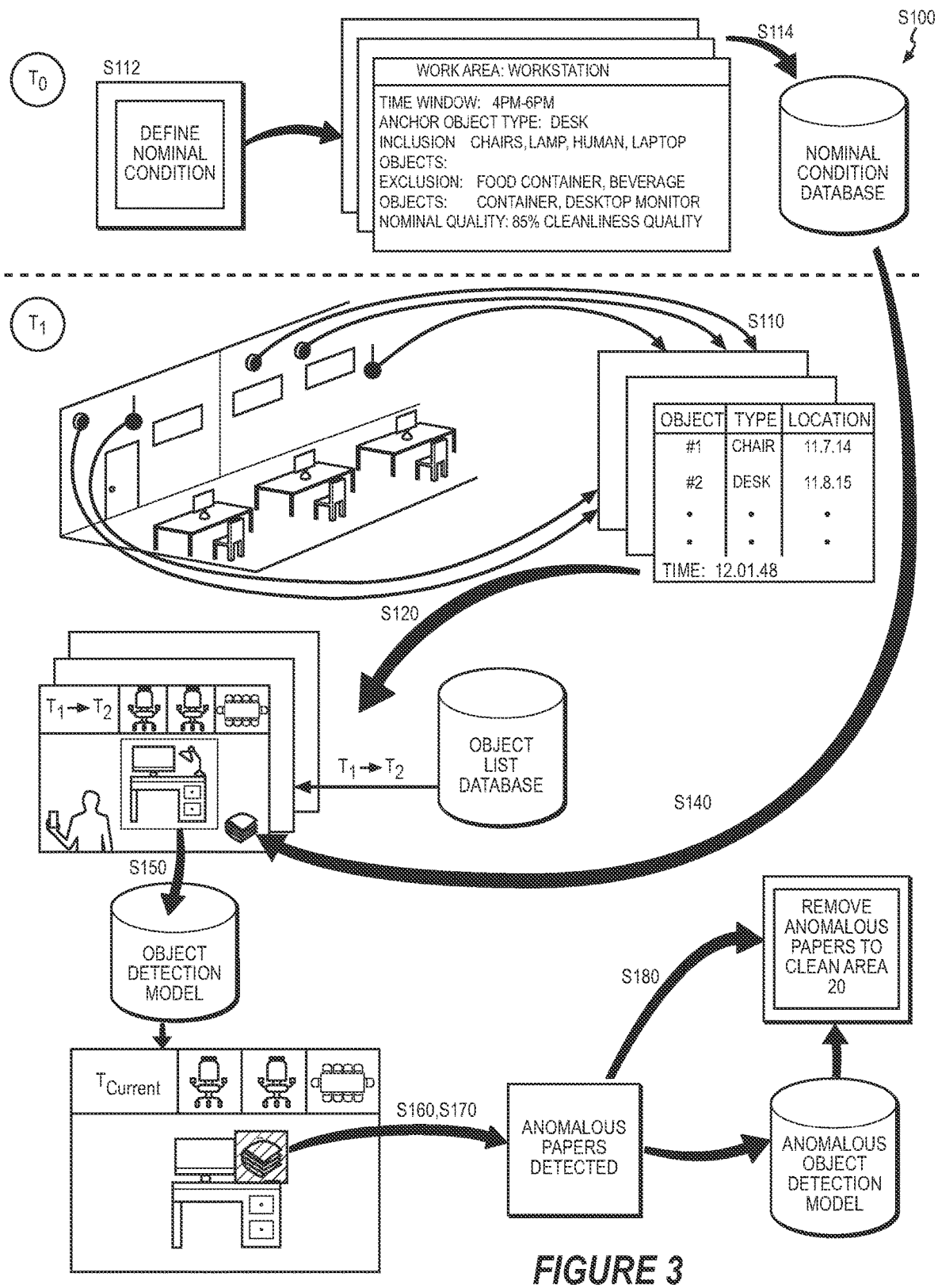
FIG. 3 is a flowchart representation of one variation of the method.
Figure 5:
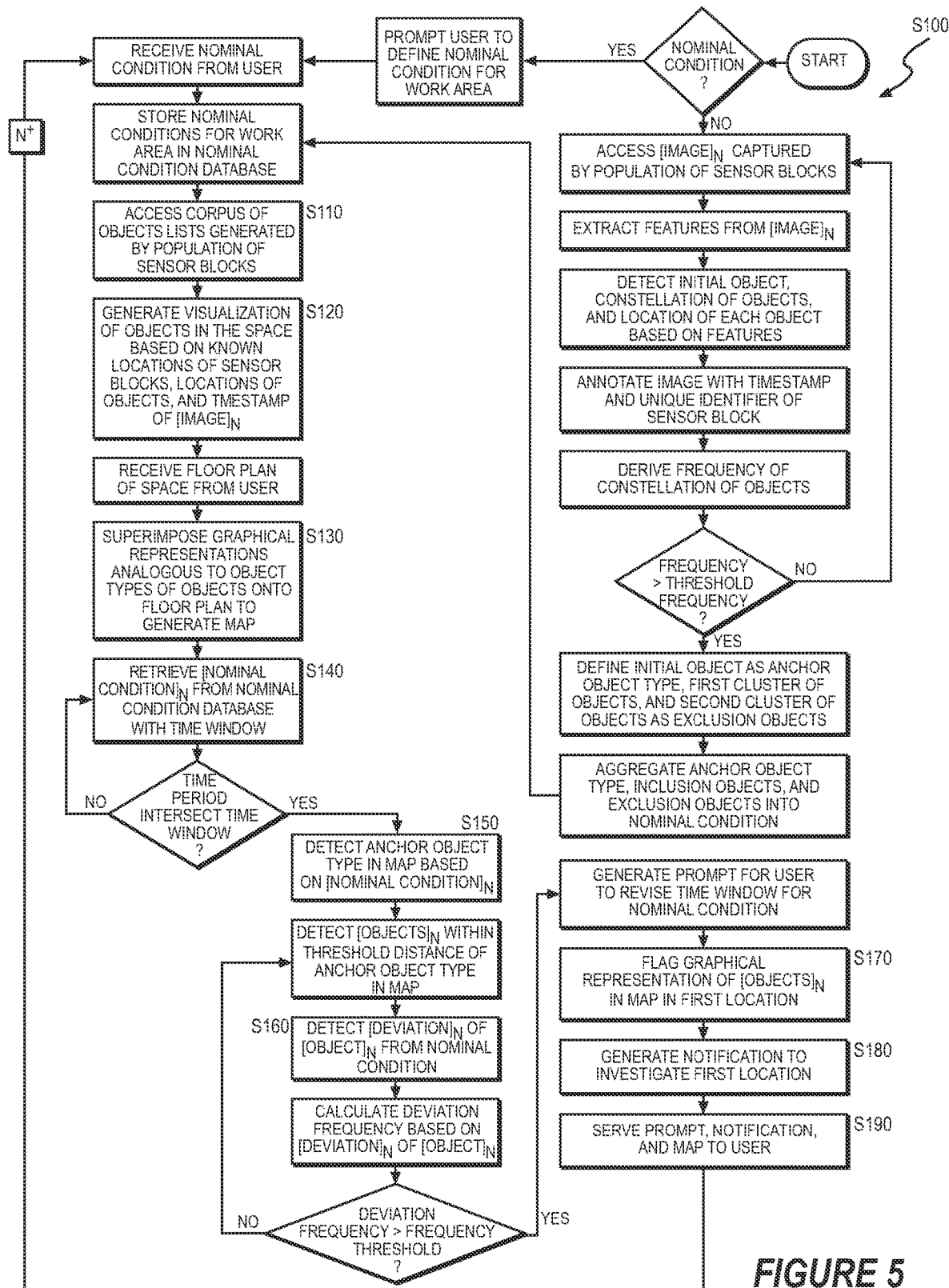
FIG. 5 is a flowchart representation of one variation of the method.

As shown in FIGS. 2, 3, and 5, one variation of the method S100 includes: receiving a nominal condition for a work area within the space, the nominal condition defining a set of inclusion objects within a threshold distance of an anchor object type for the work area Block S114; accessing a corpus of object lists, each object list in the corpus of object lists generated based on objects detected in images captured by a population of sensor blocks arranged in the space in Block S110; compiling locations and object types of a first set of objects represented in the corpus of object lists into a map of the space based on known locations of the population of sensor blocks in Block S120; and detecting the anchor object type in the map according to the nominal condition in Block S150. This variation of the method S100 further includes, in response to detecting a subset of objects, in the first set of objects, within the threshold distance of the anchor object type in the map and deviating from the set of inclusion objects: identifying the subset of objects as anomalous in a first location within the map in Block S160; flagging graphical representations of the subset of objects in the map in Block S170; and generating a notification to investigate the first location for the subset of objects in Block S180.

Figure 4:
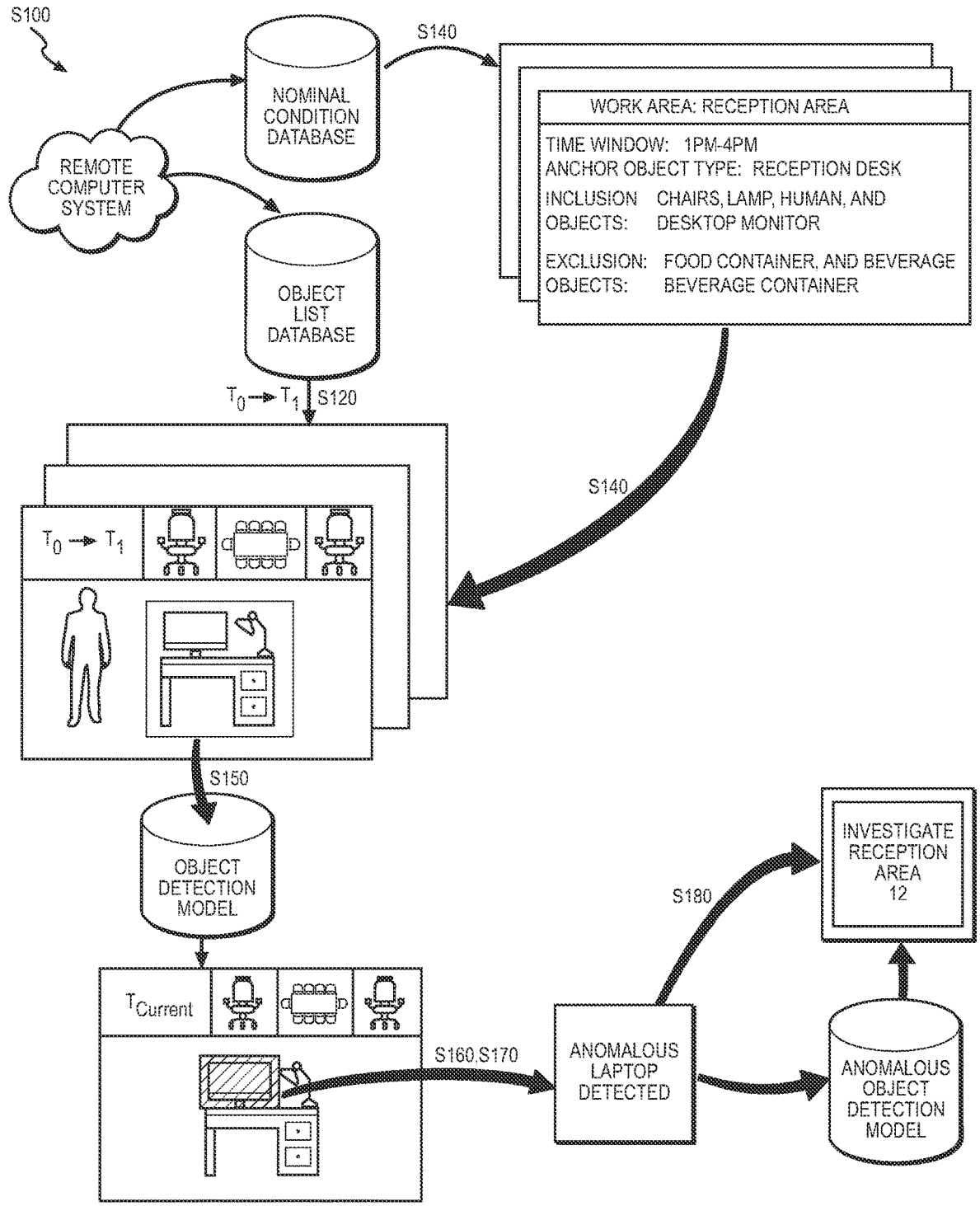
FIG. 4 is a flowchart representation of one variation of the method.

As shown in FIG. 4, one variation of the method S100 includes: accessing a corpus of object lists, each object list in the corpus of object lists generated based on objects detected in images captured by a population of sensor blocks arranged in the space in Block S110; and compiling locations and object types of a first set of objects represented in the corpus of object lists into a map of the space based on known locations of the population of sensor blocks in Block S120; accessing a nominal condition of the space defining a set of inclusion objects within a threshold distance of an anchor object type and defining a set of exclusion objects within the threshold distance of the anchor object type in Block S140; and detecting the anchor object type in the map according to the nominal condition in Block S150. This variation of the method S100 further includes, in response to detecting a subset of objects, in the first set of objects, within the threshold distance of the anchor object type in the map and deviating from the set of inclusion objects and the set of exclusion objects: identifying the subset of objects as anomalous in a first location within the map in Block S160; and generating a notification to investigate the first location for the subset of objects in Block S180.

2. Applications

Generally, Blocks of the method S100 can be executed by a remote computer system and/or a local gateway in conjunction with a population of sensor blocks arranged throughout a space (e.g., a workspace, an office space): to monitor static and dynamic objects within the space based on features detected in images captured by these sensor blocks; to interpret conditions within the space based on constellations of objects detected by these sensor blocks; to represent these constellations of objects in a map of the space (e.g., augmented two-dimensional floor plan) by populating the map with locations, orientations, and graphical representations analogous to object types of objects detected by these sensor blocks over periods of time; to access a nominal condition (e.g., baseline condition, target condition) of a work area within the space from a nominal condition database; to detect deviations from the nominal condition of the work area in the map; and to present this map of graphical representations of object types analogous to objects in the space to a user (e.g., an administrator or manager affiliated with the space), thereby enabling the user to achieve and maintain awareness of usage of work areas within the space, object flow within the space, and actions within the space over time with no or minimal exposure of private employee (or "worker") information to the user or other entity.

Furthermore, the remote computer system can implement regression, machine learning, and/or other techniques to develop models for (or "learn") common object groupings within the space—such as clusters of similar or different object types as a function of location in the space, time of day, weather, and/or human occupancy—based on constellations of objects detected in the space by the sensor blocks over time. The remote computer system can also: detect anomalous clusters of objects occurring within the space (i.e., clusters of objects that deviate from common object groupings, clusters of objects that deviate from a nominal condition); and automatically generate prompts to investigate such anomalous clusters of objects. For example, the remote computer system can: label graphical representations of anomalous dusters of objects in the map of the space as anomalous; and serve the map with an investigation prompt to the user, such as once per day or in real-time in response to detecting anomalous clusters of objects.

The remote computer system can further execute Blocks of the method S100 to: collect user feedback responsive to these prompts; and reinforce an object detection model (implemented by the population of sensor blocks to identify objects) and an anomalous object detection model (implemented by the remote computer system to annotate the map of the space) responsive to positive feedback from the user.

Additionally or alternatively, responsive to negative feedback from the user, the remote computer system can: retrieve or trigger a collection of image data from the sensor blocks deployed in the space; retrain the object detection model based on these image data; and/or update the anomalous object detection model accordingly.

Therefore, Blocks of the method S100 can be executed by a remote computer system: to provide deeper insight into space usage, object flow, and actions within the space; to maintain personal privacy (e.g., for employees, customers) by representing objects in the space with generic graphical representations of object types analogous to these objects populated in maps of the space; to automatically generate and serve prompts to investigate object-based anomalies in the space; and to automatically retrain models for object detection, object-based anomaly detection, and object-based anomaly response.

The method S100 is described herein as executed by the remote computer system to detect, track, visualize, and manage objects within a space, such as an office or clinic. However, the remote computer system can similarly execute Blocks of the method S100 to detect, track, visualize, and manage objects within an industrial, educational, municipal, or other setting.

3. Sensor Block

A sensor block can include: an optical sensor defining a field of view; a motion sensor configured to detect motion in or near the field of view of the optical sensor; a processor configured to extract data from images recorded by the optical sensor; a wireless communication module configured to wirelessly transmit data extracted from images; a battery configured to power the optical sensor, the processor, and the wireless communication module over an extended duration of time (e.g., one year, five years); and an housing configured to contain the optical sensor, the motion sensor, the processor, the wireless communication module, and the battery and configured to mount to a surface within the field of view of the optical sensor intersecting an area of interest within the facility (e.g., a conference table within a conference room, a cluster of agile desks in an agile work environment).

The optical sensor can include: a color camera configured to record and output two-dimensional color images; and/or a depth camera configured to record and output two-dimensional depth images or three-dimensional point clouds. However, the optical sensor can define any other type of optical sensor and can output visual or optical data in any other format.

The motion sensor can include a passive infrared sensor (or "PIR" sensor) that defines a field of view that overlaps the field of view of the optical sensor and that passively outputs a signal representing motion within (or near) the field of view of the optical sensor. Furthermore, the sensor block can transition from an inactive state to an active state responsive to an output from the motion sensor indicating motion in the field of view of the motion sensor; the sensor block can then trigger the optical sensor to record an image (e.g., a two-dimensional color image), which may capture a source of the motion detected by the motion sensor.

In one example, the motion sensor is coupled to a wake interrupt pin on the processor. However, the motion sensor can define any other type of motion sensor and can be coupled to the processor in any other way.

In one variation, the sensor block also includes: a distance sensor (e.g., a one-dimensional infrared depth sensor); an ambient light sensor; a temperature sensor; an air quality or air pollution sensor; and/or a humidity sensor. However, the sensor block can include any other ambient sensor. In the active state, the sensor block can sample and record data from these sensors and can selectively transmit these data—paired with insights extracted from images recorded by the sensor block—to a local gateway. The sensor block can also include a solar cell or other energy harvester configured to recharge the battery.

The processor can locally execute Blocks of the method S100, as described above and below, to selectively wake responsive to an output of the motion sensor, to trigger the optical sensor to record an image, to write various insights extracted from the image, and to then queue the wireless communication module to broadcast these insights to a nearby gateway for distribution to the remote computer system when these insights exhibit certain target conditions or represent certain changes.

The optical sensor, motion sensor, battery, processor, and wireless communication module, etc. can be arranged within a single housing configured to install on a flat surface—such as by adhering or mechanically fastening to a wall or ceiling—with the field of view of the optical sensor facing outwardly from the flat surface and intersecting an area of interest within the facility.

However, this "standalone," "mobile" sensor block can define any other form and can mount to a surface in any other way.

3.1 Wired Power & Communications

In one variation, each sensor block, in the population of sensor blocks, additionally or alternatively includes a receptacle or plug configured to connect to an external power supply within the facility—such as a power-over-Ethernet cable—and sources power for the optical sensor, processor, etc. from this external power supply. In this variation, the sensor block can additionally or alternatively transmit data—extracted from images recorded by the sensor block—to the remote computer system via this wired connection (i.e., rather than wirelessly transmitting these data to a local gateway).

4. Local Gateway

The system can also include a local gateway: configured to receive data transmitted from the population of sensor blocks nearby via wireless communication protocol or via a local ad hoc wireless network; and to pass these non-optical data to the remote computer system, such as over a computer network or long-range wireless communication protocol. For example, the gateway can be installed near and connected to a wall power outlet and can pass data received from a nearby sensor block to the remote computer system in (near) real-time. Furthermore, multiple gateways can be installed throughout the facility and can interface with the population of sensor blocks installed nearby to collect data from these sensor blocks and to return these data to the remote computer system.

In one variation, each sensor block transmits an (raw or compressed) image—recorded by the optical sensor in the sensor block during a scan cycle executed by the sensor block while in an active state—to a nearby gateway, and the gateway executes the method S100 and techniques described above and below to extract insights from this image and to return these insights to the remote computer system (e.g., scans the raw or compressed image).

5. Sensor Output

Generally, each sensor block can generate non-optical data, extract characteristics of objects detected, annotate these data, and transmit these data to the remote computer system. More specifically, for each sampling period (e.g., once per ten-minute interval, once per ten-second interval when the sensor block detects motion in its field of view) the sensor block can: generate an object list (e.g., map, table, image) of object types in the field of view of the sensor, locations of these object types, and orientations of these object types. Furthermore, the sensor block can annotate the object list with a timestamp and an unique identifier (e.g., a UUID, MAC address, IP address, or other wireless address, etc.) pertaining to the sensor block and transmit the annotated object list to the remote computer system, such as via a wired or wireless connection (e.g., via the local gateway).

In one variation, each sensor block can extract object orientations of object types from the object list at the sensor block including: speed and/or velocity (i.e., speed and direction of motion) and dimensions (e.g., length, width, height, magnitude, etc.) of the object types.

6. Remote Computer System

The remote computer system—such as a remote server—can receive non-optical data from one or more gateways installed in the facility (or directly from sensor blocks) and can manipulate these non-optical data to update schedulers for various spaces or assets in the facility, to selectively trigger a prompt for a user to investigate certain areas of the facility in Block S180, to execute actions (e.g., generate notifications) in response to detecting anomalies, to reinforce and/or update the object detection model and the nominal condition of the work area at the population of sensor blocks deployed in the space, to reinforce and/or update the anomalous object detection model at the population of sensor blocks deployed in the space, and/or control various actuators coupled to the facility based on these data, as described below.

6.1 Data Aggregation

In one variation, the remote computer system can collect an annotated object list with time stamps and an unique identifier (e.g., a UUID, MAC address, IP address, or other wireless address, etc.) from the population of sensor blocks deployed in the space over a period of time (e.g., one day, one week, one month). Then, the remote computer system can store these annotated object lists for each sensor block in an object list database.

6.2 Object Constellation Instance

As described below, the remote computer system can compile object lists into a timeseries visualization of object types detected in (e.g., present and/or moving throughout) the space. More specifically, the remote computer system can generate a visualization of object flow throughout the space based on: known locations of sensor blocks in the space; locations of objects detected in images captured by individual sensor blocks; and timestamps of these images.

7. Existing Digital Floorplan

In one variation, the remote computer system can retrieve an existing digital two-dimensional or three-dimensional floor plan of the space (e.g., agile work environment) and project graphical representations of object types onto the existing digital two-dimensional or three-dimensional floorplan to generate the visualization of object flow through the space.

For example, the remote computer system can define a first time window for representation within a first visualization frame. In this example, the sensor blocks can be configured to capture and process images at a maximum frame rate of once per second. Therefore, the remote computer system can define a time window of ten seconds and represent all objects detected by the population of sensor blocks (that published object lists) within a ten-second time window within a single visualization frame.

Then, the remote computer system can: populate the first visualization frame with the existing digital two-dimensional or three-dimensional floorplan; and retrieve a first set of object lists—generated by sensor blocks in the space—labeled with timestamps within the first time window. The remote computer system can also select a first object list—generated by a first sensor block and labeled with a first timestamp—from the first set of object lists. For a first object represented in the first object list, the remote computer system can: extract a first object type of a first object class, a first orientation; a first location (in the field of view of the first sensor block), etc., from the first object list; retrieve a first graphical representation of the first object type from a database; calculate a target location and orientation of the first object in the space at the first timestamp based on the first location of the first object defined in the first object list, the first orientation of the first object defined in the first object list, and a known position and orientation of the first sensor block (or the field of view of the first sensor block) in the space; and locate (or "project") the first graphical representation of the first object type of the first object onto the floor plan at the target location and orientation.

The remote computer system can implement and repeat these methods and techniques for each other object in the first object list; repeat for each other object list in the first set of object lists to complete first visualization frame; and repeat for each other time window to generate a timeseries of visualization frames representing object flow within the space over a time period (e.g., one day).

Furthermore, the remote computer system can generate a visualization of a set of objects in the space based on: known locations of the population of sensor blocks; locations of the set of objects extracted from the corpus of object lists; and timestamps of images extracted from the corpus of object lists. The remote computer system can then project graphical representations (e.g., graphical icons) analogous to object types of the set of objects onto the visualization of the set of objects in the space.

7.1 Upsampled Object Lists

In another variation, the remote computer system can: set a target frame rate for the visualization frames of the space (e.g., one frame per minute); track actual rates of inbound object lists received from sensor blocks in the space over time; identify intervals of inbound object list frequency less than the target frame rate; and selectively interpolate object lists for individual sensor block for period of low inbound object list frequency in order to upsample effective inbound object lists for the population of sensor blocks in the space to the target frame rate. For example, the remote computer system can: receive thirteen inbound object lists at a rate of once per ten-minute interval over a period of two hours from a first sensor block, such as due to low or no human activity in the field of view of the first sensor block; and interpolate object types and positions represented in these thirteen object lists to generate an additional synthetic object lists for the first sensor block—and thus the region of the space within the field of view of the first sensor block—for this two-hour period. The remote computer system can repeat this process for other low object list frequency intervals for other sensor blocks in order to upsample object lists from these first sensor blocks to the target frame rate.

Furthermore, the remote computer system can implement methods and techniques described above to generate the timeseries of visualization frames representing object flow within the space over a time period (e.g., one day) based on these upsampled object lists for the population of sensor blocks deployed in the space.

7.2 Visualization of Object Flow

In one variation, the remote computer system can superimpose objects onto the existing digital two-dimensional floor plan of the space based on known locations of all the sensor blocks to generate the visualization of object flow through the space.

For example, the remote computer system can access the existing digital two-dimensional floor plan of the space and implement methods and techniques described above to: extract object types, locations, and orientations from the object lists generated by the population of sensor blocks; access a template graphical representation (e.g., graphics, symbols, icons) database associated with each object type; and retrieve graphical representations of each object type from the template graphical representation database. Then, the remote computer system can superimpose these graphical representations analogous to object types of objects onto the existing digital two-dimensional floor plan and label these objects with their object type (e.g., desk, monitor, chair), thus generating an augmented two-dimensional floor plan (or "map") of the space based on the combination of the existing digital two-dimensional floor plan of the space and the objects detected by the population of sensor blocks deployed in the space.

7.3 Absent Digital Floor Plan

In one variation, when an existing digital two-dimensional or three-dimensional floor plan is absent, the system can generate an augmented two-dimensional floor plan (or "map") of the space based on locations and orientations of object types detected by the population of sensor blocks deployed in the space and project graphical representations of object types onto the augmented two-dimensional floor plan.

For example, the remote computer system can implement the methods and techniques described above to extract object types, orientations, and locations from the object lists—generated by the sensor blocks in the space—to populate an augmented two-dimensional floor plan of the space. The system can locate (or "project") graphical representations of each object type of each object onto the augmented two-dimensional floor plan based on the locations and orientations of each object type and the known locations of the population of sensor blocks deployed in the space. Then, the remote computer system can present the augmented two-dimensional floor plan to a user.

7.4 Example: Graphical Representations

In one example, the remote computer system can implement methods and techniques described above to extract object types, locations and orientations from an object list generated by a sensor block in the population of sensor blocks deployed throughout the space and label objects with their object type. In this example, the remote computer system can: access the template graphical representation (e.g., graphics, symbols, icons) database associated with each object type; select a furniture object type graphical representation (e.g., a desk) from the database; arrange and project the furniture object type graphical representation on top of all pixels labeled "desk" in the augmented two-dimensional floor plan; select a human object type graphical representation (e.g., a human) from the database; arrange and project the human object type graphical representation, on top of all pixels labeled "human" in the augmented two-dimensional floor plan; and present the augmented two-dimensional floor plan to a user to validate the object type detection by the sensor block.

The remote computer system can select, arrange, and project object type graphical representations for each other object and for each other object list generated by the population of sensor blocks and present the augmented two-dimensional floor plan to the user to validate the object type detection by each sensor block in the population of sensor blocks.

8. Nominal Condition

Generally, the remote computer system can access a nominal condition (e.g., baseline condition, target condition) for each work area (e.g., a workstation, a conference room, a reception area, a lobby, a lounge, a cafeteria) within the space. The nominal condition defines a common set of inclusion objects, set of exclusion objects, and an anchor object type during a given time window for each work area. The nominal condition is further assigned to a location associated with the work area, to a time window (e.g., 7 AM to 11 AM, 6 PM to 9 PM) for detecting the nominal condition within the work area, to a target quantity of objects within a threshold distance of the anchor object type, and/or to a nominal quality associated with the work area during the time window.

More specifically, each nominal condition can define: an anchor object type for the work area that is present and immutable (e.g., unmoving, constant); a set of inclusion objects including objects detected within the work area that are present and mutable (e.g., moving) within a threshold distance of the anchor object type; and a set of exclusion objects including objects that are absent and mutable (e.g., moving) within the threshold distance of the anchor object type for the time window associated with the nominal condition. Additionally, each nominal condition is assigned to a nominal quality (e.g., target quality, baseline quality) such as a cleanliness quality, a lighting quality, a comfortability quality, etc. for the work area.

In one implementation, the remote computer system can access a nominal condition, defined by the user (e.g., administrator or manager) affiliated with the space, for each work area and compile these nominal conditions for each work area into a nominal condition database. Additionally or alternatively, the remote computer system can autonomously define an anchor object type, a common set of inclusion objects, a common set of exclusion objects over a given duration of time (e.g., one week, one month, six months) to generate the nominal condition for each work area and compile these nominal conditions for each work area into the nominal condition database. The remote computer system can then execute Blocks of the method S100 to: scan the augmented two-dimensional floor plan of the space for objects within the threshold distance of the anchor object type for a work area; identify objects deviating from the set of inclusion objects and the set of exclusion objects during the time window for the nominal condition; and identify objects deviating from the nominal quality (e.g., cleanliness quality, lighting quality, comfortability quality), as further described below.

8.1 User Defined Nominal Condition

In one implementation, the remote computer system can retrieve a nominal condition of each work area defined by a user (e.g., administrator or manager) affiliated with the space and compile these nominal conditions into a nominal condition database.

Furthermore, the remote computer system can: isolate each work area within the augmented two-dimensional floor plan; prompt the user to provide a nominal condition for each work area defining a set of inclusion objects, a set of exclusion objects, and an anchor object type; and store these nominal conditions for each work area in a nominal condition database.

In one variation, the remote computer system can: isolate a work area within the augmented two-dimensional floor plan; and prompt an administrator to define a nominal condition for the work area. The administrator can then: define an anchor object type; define a set of inclusion objects within a threshold distance of the anchor object type; define a set of exclusion objects within the threshold distance of the anchor object type; and assign a time window for detection of the nominal condition within the work area. The remote computer system can then receive the nominal condition from the administrator via a user portal; store the nominal condition for the work area in a nominal condition database; and later retrieve the nominal condition from the nominal condition database. The remote computer system can then track constellations of objects within and/or moving throughout the work area and detecting anomalous objects deviating from the nominal condition for the work area.

In one example, the remote computer system can: isolate a workstation within the augmented two-dimensional floor plan; and prompt an administrator to define a nominal condition for the workstation. The administrator can then: define a desk object as the anchor object type for the workstation; define a laptop, a human, a notepad, a chair, and a beverage container as the set of inclusion objects within a threshold distance (e.g., two feet) of the anchor object type; define a food container, a conference phone, and a whiteboard as the set of exclusion objects within the threshold distance (e.g., two feet) of the desk object; and assign a time window of 8 AM to 11 AM for detection of the nominal condition within the workstation. The remote computer system can then receive the nominal condition from the administrator via a user portal; store the nominal condition for the workstation in a nominal condition database; and later retrieve the nominal condition from the nominal condition database. Thus, the remote computer system can: detect the desk object for the workstation in the map according to the nominal condition; track constellations of objects within and/or moving throughout the workstation; and detect anomalous objects deviating from the nominal condition.

In another example, the remote computer system can: isolate a reception area within the augmented two-dimensional floor plan; and prompt an administrator to define a nominal condition for the reception area. The administrator can then: define a reception desk object as the anchor object type for the reception area; define a desktop monitor, a human, a chair, and a lamp as the set of inclusion objects within a threshold distance (e.g., two feet) of the anchor object type; define a beverage container, a food container, and a laptop as the set of exclusion objects within the threshold distance (e.g., two feet) of the reception desk object; and assign a time window of 1 PM to 4 PM for detection of the nominal condition within the reception area. The remote computer system can then receive the nominal condition from the administrator via a user portal; store the nominal condition for the reception area in a nominal condition database; and later retrieve the nominal condition from the nominal condition database. Thus, the remote computer system can: detect the reception desk object for the reception area in the map according to the nominal condition; track constellations of objects within and/or moving throughout the reception area; and detect anomalous objects deviating from the nominal condition, as shown in FIG. 4.

8.2 Autonomous Nominal Condition

In one implementation, when a nominal condition, defined by the user is absent, the remote computer system can autonomously generate a nominal condition for each work area within the space over a given duration of time (e.g., one week, one month, six months) and store these nominal conditions in the nominal condition database, as shown in FIG. 5.

Furthermore, the remote computer system can implement methods and techniques described above to access a sequence of images captured by the population of sensor blocks during a given time period and then, for each image in the sequence of images: extract a set of features from the image; detect an initial object based on the set of features; detect a constellation of objects based on the set of features; derive a location and an object type of each object in the constellation of objects based on the set of features; and annotate the image with a timestamp and a unique identifier associated with a corresponding sensor block, in the population of sensor blocks. The remote computer system can then derive a frequency of the constellation of objects within the threshold distance of the initial object during the given time period and, in response to the frequency of the constellation of objects within the threshold distance of the initial object exceeding a threshold frequency: define the initial object as an anchor object type; define a first cluster of objects in the constellation of objects as a set of inclusion objects; define a second cluster of objects excluded from the constellation of objects as the set of exclusion objects; and aggregate the anchor object type, the set of inclusion objects, and the set of exclusion objects into a nominal condition of a work area within the space for the given time period.

The remote computer system can repeat these methods and techniques for each other sensor block, for each other work area, and for each other constellation of objects to autonomously generate a nominal condition for each work area within the space. The remote computer system can then compile these nominal conditions into a nominal condition database for the space and retrieve a nominal condition from the nominal condition database prior to tracking constellations of objects within and/or moving throughout the space and detecting deviations from these constellations of objects.

9. Autonomous Condition+Action

Furthermore, the remote computer system can execute Blocks of the method S100 to access a nominal condition of a work area within the space defining inclusion objects and exclusion objects within a threshold distance of an anchor object type; detect the anchor object type in the augmented two-dimensional floor plan of the space according to the nominal condition; and isolate a set of objects (e.g., constellation of objects)—extracted from the corpus of object lists generated by the population of sensor blocks—in the augmented two-dimensional floor plan of the space; and detect a subset of objects (or "cluster of objects") in the set of objects within the threshold distance of the anchor object type in the augmented two-dimensional floor plan of the space.

The remote computer system can then track constellations (or "groups") of object types over a period of time (e.g., one day, one week, one month) within the threshold distance of the anchor object type; derive and learn models for common groups of object types within the space; detect deviations (or "anomalies") from these groups of object types; and execute actions (e.g., generate notifications) in response to detecting such anomalies.

Generally, the remote computer system can detect patterns of common groups of object types within the threshold distance of the anchor object type as a function of location in the space, time of day, weather, and/or human occupancy. More specifically, patterns of common groups of object types as a function of location in the space can include furniture layout moved from an office to a conference room in the space or furniture layout rearranged by users in the space. The patterns of common groups of object types as a function of time of day can include paper object types that need to be cleared from all desk object types in the space at a specific time period (e.g., 5 PM, 6 PM) or trash can object types that need to be emptied from the space at a later time period (e.g., 9 PM, 10 PM), or monitoring normal object types in ambient lighting during daylight. The patterns of common groups of object types as a function of weather can include detecting closed window type objects as normal in an office during the winter season, detecting open window type objects during daylight as normal in the summer season or detecting heating, ventilation, and air conditioning (or "HVAC") quality. The patterns of common groups of object types as a function of human occupancy can include monitoring usage of the space by humans and detecting desk object type availability based on detecting a desk object type as occupied with human present, occupied with human absent, and/or vacant.

Furthermore, in response to detecting an anomaly (or "deviation") from the pattern of common group of object types, the remote computer system can: identify the cluster of objects deviating from the set of inclusion objects and the set of exclusion objects in a location within the concurrent map of the space; annotate (or "highlight") a cluster of graphical representations analogous to the cluster of objects defining the anomaly in the concurrent map of the space; generate a notification to investigate location for the anomalous cluster of objects; and transmit the notification and the map to the user, thereby enabling the user to timely review and focus attention on the anomaly rather than common distributions of objects in the space.

Then, if the user confirms an anomaly from the pattern of the common group of object types, the remote computer system can reinforce the model identifying the duster of objects as anomalous. Additionally or alternatively, if the user discards the anomaly or otherwise indicates the anomaly is benign or unactionable, the remote computer system can relabel the anomaly as "normal" or "benign" and mute notifications for similar future constellations of objects detected in the space.

9.1 Preloaded Actions for Anomaly Characteristics

Furthermore, the remote computer system can prompt the administrator to define an action executable by the remote computer system responsive to detecting any anomalous cluster of objects, an anomalous cluster of objects in a particular location in the space, or an anomalous duster of objects containing a particular set of object types, such as: activate a building alarm; change an HVAC setting; or notify a building administrator. The remote computer system can then automatically execute such actions in response to detecting anomalous clusters of objects that fulfill these anomaly definitions.

Therefore, the remote computer system can cooperate with the user to define automatic actions executable by the remote computer system responsive to detecting anomalous dusters of objects that match predefined anomaly characteristics.

9.2 Modeling: Common Object Groups

In one variation, the remote computer system can: track groups of object types within the space over a period of time; detect common groups of object types within a period of time (e.g., one day, one week); and derive object detection models based on patterns of the common groups of object types.

For example, the remote computer system can: detect a common group of object types (e.g., a chair, a laptop, and a human) located within a threshold distance of an anchor object type (e.g., a desk) and repeating at a high frequency during a time period (e.g., 9 AM to 1 PM) within a workspace; track the frequency of the common group of object types during future time periods; define a pattern based on the frequency of the common group of object types detected during the future time periods; generate an object detection model based on the pattern of the common group of object types for the workspace; and transmit the object detection model to the population of sensor blocks deployed in the space.

Therefore, the remote computer system can derive and learn object detection models, implemented by the sensor blocks deployed in the space, based on patterns of common groups of object types.

9.3 Condition: Anomaly Detection

Generally, the remote computer system can implement regression, modeling, and/or computer vision techniques to derive (or "learn") anomalous object detection models based on patterns of anomalies of objects deviating from common groups of objects and/or deviating from a nominal quality (e.g., cleanliness quality, lighting quality, comfortability quality) defined in the nominal condition for each work area within the space.

9.3.1 Anomaly Detection: Deviations from Common Group of Objects

In one implementation, the remote computer system can detect anomalous object types that deviate from the pattern of the common group of objects in a work area within the space.

For example, the remote computer system can: detect a common group of object types (e.g., a table, a set of chairs, a whiteboard, and a trashcan) in a conference room; track the common group of objects types in the conference room during a period of time (e.g., one week); detect an anomalous backpack object type in the conference room; and generate a notification for a user to investigate the anomalous backpack object type detected in the conference room. Then, responsive to the user's indication that the anomalous backpack object type was present and anomalous, the remote computer system can: track the frequency of the anomalous backpack object type during a second period of time (e.g., one week); define a pattern based on the frequency of the anomalous backpack object type detected during the second time period; and generate an anomalous object detection model based on the pattern of the anomalous backpack object type for the conference room.

Therefore, the remote computer system can derive and learn anomalous object detection models based on patterns of anomalies of objects deviating from common groups of objects defined in the nominal condition for each work area within the space.

9.3.2 Anomaly Detection: Deviations from Nominal Quality

In one implementation, the remote computer system can detect anomalous object types that deviate from a nominal quality (e.g., cleanliness quality, lighting quality, comfortability quality) of the work area as defined in the nominal condition of the work area.

In one example, the remote computer system can detect anomalous object types that deviate from a nominal cleanliness quality of a workstation in the space. In this example, the remote computer system can: retrieve a nominal condition of a workstation—defining the anchor object type as a desk object for the workstation, assigned to a nominal cleanliness quality for the workstation, and assigned to a time window, after working hours (e.g., 6 PM to 9 PM), for cleanliness verification of the workstation—from the nominal condition database; detect the desk object for the workstation in the map according to the nominal condition; detect a common group of object types (e.g., a chair, a laptop, a lamp, a beverage container, stacks of papers) in the workstation; track the common group of objects types in the workstation during a period of time (e.g., one week); detect a duster of objects (e.g., a stack of papers), in the common group of object types, within a threshold distance of the desk object in the map; and access a time of day of the workstation based on timestamps of images captured by sensor blocks facing the workstation.

Then, in response to the time of day intersecting the time window (e.g., 6 PM to 9 PM) defined in the nominal condition, the remote computer system can derive a cleanliness quality of the workstation based on the cluster of objects (e.g., a stack of papers). Then, in response to the nominal cleanliness quality exceeding the cleanliness quality of the workstation, the remote computer system can: identify the cluster of objects (e.g., a stack of papers) as anomalous in a first location within the map; highlight the anomalous cluster of objects (e.g., a stack of papers) in the map; generate a notification to investigate the first location for the anomalous cluster of objects (e.g., a stack of papers); generate a recommendation to remove the anomalous duster of objects (e.g., a stack of papers) from the first location to clean the workstation; and transmit the notification and the recommendation to the user affiliated with the space. Thus, the remote computer system can: detect anomalous objects deviating from a nominal cleanliness quality of the work area and provide recommendations to the user; and thereby, enable the user to achieve the nominal cleanliness quality of the highlighted work area without manually checking each work area after working hours.

In another example, the remote computer system can detect anomalous object types that deviate from a nominal lighting quality of a workstation in the space. In this example the remote computer system can: retrieve a nominal condition of a workstation—defining the anchor object type as a desk object abutting a window in the facility for the workstation, assigned to a nominal lighting quality for the workstation, and assigned to a time window, during working hours (e.g., 8 AM to 5 PM), for lighting detection of the workstation—from the nominal condition database; detect the desk object abutting the window in the facility for the workstation in the map according to the nominal condition; detect a common group of object types (e.g., a chair, a laptop, a lamp, a beverage container, stacks of papers) in the workstation; track orientations and positions of the common group of object types in the workstation—relative the desk object abutting the window in the facility—during a period of time (e.g., one week); detect a cluster of objects (e.g., a chair, a laptop, a lamp), in the common group of object types, within a threshold distance of the desk object in the map; and access a time of day of the workstation (e.g., 2 PM) based on timestamps of images captured by sensor blocks facing the workstation.

Then, in response to the time of day intersecting the time window (e.g., 8 AM to 5 PM) defined in the nominal condition, the remote computer system can derive a lighting quality of the workstation based on the orientations and positions of the duster of objects (e.g., a chair, a laptop, a lamp) relative the desk object abutting the window in the facility. In response to the nominal lighting quality exceeding the lighting quality of the workstation, the remote computer system can: identify the duster of objects (e.g., a chair, a laptop, a lamp) as anomalous in a first location within the map; highlight the cluster of objects (e.g., a chair, a laptop, a lamp) in the map; generate a notification to investigate the first location for the cluster of objects (e.g., a chair, a laptop, a lamp); generate a recommendation to adjust the orientation of the desk object abutting the window within the facility; and transmit the notification and the recommendation to the user. Thus, the remote computer system can: detect anomalous objects deviating from a nominal lighting quality of the work area and provide recommendations to the user; and thereby, enable the user to achieve the nominal lighting quality of the work area without manually checking each work area during working hours for the nominal lighting quality.

Therefore, the remote computer system can derive and learn anomalous object detection models by tracking patterns of anomalies of objects deviating from a nominal quality (e.g., cleanliness quality, lighting quality, comfortability quality) defined in the nominal condition for each work area within the space.

9.4 Action: Anomaly Response

Furthermore, responsive to detecting an anomalous cluster of objects deviating from common groups of objects and/or from a nominal quality, the remote computer system can execute actions (e.g., generate notifications) to notify a user to investigate the anomalous cluster of objects and then reinforce and/or retrain the anomalous object detection model for each work area.

Accordingly, responsive to the user's indication that the anomalous cluster of objects was present and anomalous, the remote computer system can reinforce the anomalous object detection model for each work area.

Similarly, responsive to the user's indication that the anomalous cluster of objects was present and normal (or "not anomalous"), the remote computer system can retrain and update the anomalous object detection model and/or revise the nominal condition for each work area.

9.5 Deviation Frequency of Anomalous Objects

In one implementation, the remote computer system can detect deviations of each anomalous cluster of objects within a time window (e.g., working hours) for detecting the nominal condition of a work area and track these deviations of each anomalous cluster of objects over a given duration of time (e.g., one week, one month, three months). The remote computer system can then calculate a deviation frequency—such as a quantity of deviations—of each anomalous cluster of objects in the space for the given duration of time.

In this implementation, the remote computer system can: detect a deviation of a cluster of objects from the set of inclusion objects and the set of exclusion objects of the nominal condition; identify the cluster of objects as anomalous in a location within the map; highlight the graphical representations of object types analogous to the anomalous cluster of objects within the map; track deviations of this anomalous cluster of objects during future time periods; and calculate a deviation frequency based on the anomalous cluster of objects. Furthermore, in response to the deviation frequency exceeding a frequency threshold, the remote computer system can: generate a prompt for the user to revise the time window for detecting the nominal condition within the work area; and serve the prompt and the map, highlighted with the anomalous cluster of objects, to the user affiliated with the space.

For example, the remote computer system can prompt the user to define the nominal condition for a lounge area within the space. The user can define: a table object as the anchor object type; a couch, a set of chairs, and a set of beverage containers as the set of inclusion objects within a threshold distance (e.g., three feet) of the table object; a desktop monitor, a notepad, and a laptop as the set of exclusion objects within the threshold distance (e.g., three feet) of the table object; and a time window (e.g., 11 AM to 1 PM) for detection of the nominal condition in the lounge area. The remote computer system can then: detect the table object in the map according to the nominal condition; and detect a backpack within the threshold distance (e.g., three feet) of the table object in the map during the time window. Then, in response to the backpack deviating from the inclusion set of objects and the set of exclusion objects (e.g., excluded from the set of inclusion objects and excluded from the set of exclusion objects), the remote computer system can: identify the backpack as anomalous in a location within the map; highlight the graphical representation of the object type analogous to the anomalous backpack within the map; track deviations of this anomalous backpack during future time periods (e.g., one week); and calculate a deviation frequency (e.g., 60 deviations) of the anomalous backpack during these future time periods (e.g., one week). Then, in response to the deviation frequency (e.g., 60 deviations) exceeding a frequency threshold (e.g., ten deviations), the remote computer system can: generate a prompt for the user to revise the time window for detecting the nominal condition within the lounge area and/or revise the set of inclusion objects and the set of exclusion objects to include the anomalous backpack; and serve the prompt and the map, highlighted with the anomalous backpack object type, to the user affiliated with the space.

Additionally or alternatively, in response to the deviation frequency (e.g., five deviations) falling below the frequency threshold (e.g., ten deviations), the remote computer system can: maintain the nominal condition for the lounge area within the nominal condition database; present the map highlighted with the anomalous backpack object type to the user for review; and access the nominal condition for the lounge area from the nominal condition database during future time periods.

In one variation, in response to the deviation frequency exceeding the frequency threshold, the remote computer system can autonomously update the time window for the nominal condition within the work area; store the updated nominal condition in the nominal condition database; and access the updated nominal condition from the nominal condition database for the work area during future time periods. Thus, the remote computer system can track deviation frequency of anomalous objects over a given period of time (e.g., one month, three months) and autonomously revise and/or update a nominal condition for each work area within the nominal condition database based on the deviation frequency.

Therefore, the remote computer system can receive an updated nominal condition for a work area from a user via the user portal and retrain the anomalous object detection model for the work area. Alternatively, over a period of time, the remote computer system can autonomously update a nominal condition for a work area within the nominal condition database and retrain the anomalous object detection model for the work area, as further described below.

10. User Validation of Model

In one implementation, the remote computer system can execute the methods and techniques described above to: detect a common group of object types in the space; detect an anomalous cluster of objects in the space; generate a notification for the anomalous cluster of objects; prompt a user to investigate the anomalous cluster of objects and provide an action. Responsive to the user's indication that the anomalous cluster of objects is present and anomalous, the remote computer system can reinforce the anomalous object detection model and receive an action from the user. Responsive to the user's indication that the anomalous cluster of objects is present and normal (or "not anomalous"), the remote computer system can relabel the anomalous cluster of objects as normal and mute related notifications in the future. Responsive to the user's indication that the common group of object types is incorrectly identified, the remote computer system can retrain or update the object detection model and transmit the updated object detection model to each sensor block, in the population of sensor blocks, deployed in the space.

10.1 Correct Group+Anomalous

In one example implementation, the remote computer system can: detect a common group of object types in the space; detect an anomalous cluster of objects in the space; generate a notification for the anomalous cluster of objects; prompt a user to investigate the anomalous cluster of objects; and, responsive to the user's indication that the anomalous cluster of objects is present and anomalous, reinforce the model and receive an action from the user.

For example, the remote computer system can: access the augmented two-dimensional floor plan; access the template graphical representation database; access the nominal condition of a workstation within the space; detect a common group of object types (e.g., a chair, a monitor, and a human) within a threshold distance of an anchor object type (e.g., a desk) in the workstation; track the common group of object types in the space over a period of time (e.g., one week); detect an anomalous cluster of objects (e.g., a lamp and a dog) within the threshold distance of the anchor type object (e.g., a desk) in the workstation; project graphical representations analogous to the object types of the anomalous cluster of objects and the common group of object types onto the augmented two-dimensional floor plan; generate a notification for the user to investigate the anomalous duster of objects and validate the common group of object types; and transmit the notification and the map flagged with graphical representations to the user. Then, responsive to the user's indication that the anomalous cluster of objects is present and anomalous, the remote computer system can reinforce the anomalous object detection model and continue to generate notifications in the future for the anomalous cluster of objects. Additionally or alternatively, responsive to the user's indication that the common group of object types is present and correct, the remote computer system can reinforce the object detection model implemented by the population of sensor blocks deployed throughout the space.

Therefore, the remote computer system can improve the object detection model by reinforcing object type detection by the population of sensor blocks in response to the user's indication that the common group of object types was correctly detected. Similarly, the remote computer system can improve the anomalous object detection model by reinforcing anomalous clusters of objects detection in response to the user's indication that the anomalous cluster of objects was correctly detected.

10.1.1 Example: Facilities Management Anomaly

In one example, a facilities management team for the space ensures the work area, objects, and amenities within the space are set up for each day. The remote computer system can notify the facilities management team with an alert (or "ticket") when there is an anomaly in the work area.

In one variation, the remote computer system can: access a nominal condition—defining a table object type as the anchor object type and a target quantity of objects (e.g., 8 chairs) within the threshold distance of the table object type—of a conference room; access the augmented two-dimensional floor plan of the space; detect the table object type for the conference room in the augmented two-dimensional floor plan according to the nominal condition; scan for a constellation of objects (e.g., chairs) in the conference room; isolate a duster of objects (e.g., chairs) within the distance threshold (e.g., six feet, two meters) of the table object type; extract a location and an orientation of each object (e.g., chair) in the cluster of objects and the table object type; and locate (or "project") a graphical representation of the location and the orientation of each object (e.g., chair) in the duster of objects and the table object type on the augmented two-dimensional floor plan. Furthermore, the remote computer system can calculate a total quantity (e.g., ten) of the cluster of objects (e.g., chairs) within the threshold distance of the table object type and, in response to the total quantity (e.g., ten) of the objects (e.g., chairs) exceeding the target quantity of objects (e.g., eight) defined in the nominal condition for the conference room, the remote computer system can: identify the duster of objects (e.g., chairs), as anomalous in a first location associated with the conference room in the map; highlight the anomalous cluster of objects (e.g., chairs) in the map; and generate a recommendation and/or alert notifying a facilities management user to investigate the anomalous cluster of objects and to reduce the total quantity of the anomalous cluster of objects (e.g., ten) to the target quantity of objects (e.g., eight) in the first location, as shown in FIG. 2.

Additionally or alternatively, the remote computer system can calculate a total quantity (e.g., six) of the duster of objects (e.g., chairs) within the threshold distance of the table object type. Then, in response to the total quantity (e.g., six) of the objects (e.g., chairs) falling below the target quantity of objects (e.g., eight) defined in the nominal condition for the conference room, the remote computer system can: identify the duster of objects (e.g., chairs), as anomalous in a first location associated with the conference room in the map; highlight the cluster of objects (e.g., chairs) in the map; and generate a recommendation and/or alert notifying a facilities management user to investigate the cluster of objects and to increase the total quantity of the duster of objects (e.g., six) to the target quantity of objects (e.g., eight) in the first location.

Accordingly, responsive to the facilities management user's indication of the anomalous duster of objects (e.g., chairs) as present and anomalous, the remote computer system can reinforce the anomalous object detection model and generate alerts for the facilities management user to investigate the anomalous location of the duster of objects (e.g., chairs) in the future.

In one implementation, responsive to detection of an anomalous location of an object in the constellation of objects (e.g., chairs) outside of the distance threshold (e.g., six feet, two meters) of the table object type, the remote computer system can highlight the object (e.g., chair) within the augmented two-dimensional floor plan and generate an alert notifying the facilities management user to investigate the anomalous location of the object (e.g., chair). Accordingly, responsive to the facilities management user's indication of the anomalous location of the object (e.g., chair) as present and anomalous, the remote computer system can reinforce the anomalous object detection model and generate alerts for the facilities management user to investigate the anomalous location of the object (e.g., chair) in the future.

In another variation, the remote computer system can implement similar methods and techniques to scan for a constellation of objects (e.g., humans) in the conference room; isolate a cluster of objects (e.g., humans) within the distance threshold (e.g., six feet, two meters) of the table object type; extract a location and an orientation of each object (e.g., human) in the duster of objects and the table object type; and locate (or "project") a graphical representation of the location and the orientation of each object (e.g., human) in the cluster of objects and the table object type on the augmented two-dimensional floor plan. Furthermore, the remote computer system can calculate a total quantity (e.g., 30) of the cluster of objects (e.g., humans) within the threshold distance of the table object type and, in response to the total quantity (e.g., 30) of the objects (e.g., humans) exceeding the target quantity of objects (e.g., 15) defined in the nominal condition for the conference room, the remote computer system can: identify the duster of objects (e.g., humans), as anomalous in a first location associated with the conference room in the map; highlight the graphical representations of the cluster of objects (e.g., humans) within the map; and generate a recommendation and/or alert notifying the facilities management user to investigate the cluster of objects and to reduce the total quantity of the cluster of objects (e.g., 30) to the target quantity of objects (e.g., 15) in the first location.

Accordingly, responsive to the facilities management user's indication of the cluster of objects (e.g., humans) as present and anomalous, the remote computer system can reinforce the anomalous object detection model and generate alerts for the facilities management user to investigate the anomalous location of the duster of objects (e.g., humans) in the future.

Therefore, the remote computer system can identify, reinforce, and/or update the anomalous object detection model for the space relating to the work area, amenities, and objects monitored by the facilities management team. Thus, anomalous object detection by the remote computer system allows the facilities management team to avoid manually checking all the work areas in the space for anomalies during an assigned time window defined in each nominal condition.

10.2 Correct Group+Normal

In another example implementation, the remote computer system can detect an anomalous group of object types and, responsive to a user's indication that the anomalous group of object types is present and normal (or "not anomalous"), the remote system can then: relabel the anomalous group of object types as normal; update the set of inclusion objects and the set of exclusion objects for the nominal condition; and mute future related notifications.

For example, the remote computer system can: access the augmented two-dimensional floor plan; access the database of graphical representations of object types; detect an anomalous group of object types (e.g., a desk, a monitor, a chair, a lamp, and a storage bin) in the space; project graphical representations of the anomalous group of object types onto the augmented two-dimensional floor plan; and generate a notification for a user to investigate the anomalous group of object types. Then, responsive to the user's indication that the anomalous group of object types is present and normal (or "not anomalous"), the remote computer system can retrain and/or update the anomalous object detection model; update and/or revise the set of inclusion objects and the set of exclusion objects for the nominal condition; and mute related notifications in the future for the anomalous group of object types.

Thus, the remote computer system can retrain/and or update the anomalous detection model and the nominal condition in response to a user's indication that the anomalous group of object types was present and not anomalous.

10.3 Incorrect Common Group of Object Types: Forward Image Capture

In one implementation, responsive to the remote computer system incorrectly identifying a common group of object types, the remote computer system can retrain the object detection model based on forward image capture at the sensor blocks deployed in the space and/or update the anomalous object detection model accordingly.

In one example implementation, the remote computer system identifies a subset of sensor blocks defining fields of view that intersect the location of an incorrectly-identified group of objects and activate image capture—rather than or in addition to object list generation—at each sensor block in this subset of sensor blocks. Then, the remote computer system can: collect these images; prompt an administrator or other operator to label objects in these images; retrain the object detection model; and update the retrained object detection model to the subset of sensor blocks or to the population of sensor blocks deployed in the space.

For example, if the error occurred at a sensor block in a particular location, the error may be likely to reoccur at this same sensor block in this same location in the future. Therefore, the remote computer system can activate image capture at the subset of sensor blocks for an extended period of time (e.g., one week) in order to detect and capture a similar error scenario in the future.

Additionally or alternatively, because the sensor blocks execute identical or similar models, a similar error may also occur at other locations in the space. Therefore, the remote computer system can activate image capture at the population of sensor blocks deployed in the space for a short period of time (e.g., one day) in order to detect and capture a similar scenario at other locations in the space.

Thus, responsive to the remote computer system incorrectly identifying a common group of object types, the remote computer system can retrain the object detection model based on future images captured by the sensor blocks deployed in the space.

10.4 Incorrect Common Group of Object Types: Past Image Capture

In one implementation, responsive to the remote computer system incorrectly identifying a common group of object types, humans label past images captured from the sensor blocks and the remote computer system can: retrain the objection detection model; upload the object detection model to the sensor blocks deployed in the space; and/or update the anomalous object detection model accordingly.

In one variation, each sensor block is configured to store raw or compressed images in a rolling buffer, such as for a duration of two days, in local memory.

Accordingly, in this variation, the remote computer system can identify a subset of sensor blocks defining fields of view that intersect the location of the incorrectly identified group of objects and query the subset of sensor blocks for images captured previously and currently stored in rolling buffers. Then, the remote computer system can: collect these images; prompt an administrator or other operator to label objects in these images; retrain and update the object detection model; and transmit the object detection model to the subset of sensor blocks or to the population of sensor blocks in the space.

Thus, responsive to the remote computer system incorrectly identifying a common group of object types, the remote computer system can retrain the object detection model based on past images captured by the sensor blocks deployed in the space.

11. Augmented Two-Dimensional Floor Plan and Three-Dimensional Map

Generally, the system is configured to aggregate data from sensor blocks deployed in the space, compile these data into positions, orientations, and object types in the space, populate an augmented two-dimensional floor plan of the space with graphical representations of these object types based on their locations and orientations, and present the augmented two-dimensional floor plan to a user.

However, the system can additionally or alternatively implement the aforementioned method and techniques to manage an augmented three-dimensional map of the space. The system can populate the augmented three-dimensional map of the space with graphical representations of object types based on their locations and orientations and present the augmented three-dimensional map to a user.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for detecting conditions within a space comprising:
   during a first period, at a first sensor block in a population of sensor blocks arranged in the space, capturing a first image via an optical sensor arranged in the first sensor block;
   extracting a first set of features from the first image;
   based on the first set of features:
      detecting a first set of objects in a first field of view of the first sensor block during the first time period; and
      deriving a location and an object type of each object in the first set of objects; and
   compiling locations and object types of the first set of objects into a first object list; and
   during a second time period, at a remote computer system:
      accessing a corpus of object lists, the corpus of object lists comprising the first object list and generated based on images captured by the population of sensor blocks;
      compiling locations of a second set of objects represented in the corpus of object lists into a map of the space based on known locations of the population of sensor blocks;
      accessing a nominal condition of the space, the nominal condition defining:
         a set of inclusion objects within a threshold distance of an anchor object type; and
         a set of exclusion objects within the threshold distance of the anchor object type and distinct from the set of inclusion objects;
      detecting the anchor object type in the map; and
      in response to detecting a subset of objects, in the second set of objects, within the threshold distance of the anchor object type in the map and deviating from the set of inclusion objects and the set of exclusion objects:
         identifying the subset of objects, proximal a first location in the map, as anomalous; and
         generating a notification to investigate the first location for the subset of objects.

2. The method of claim 1, further comprising, during the first time period, at the remote computer system:
   accessing a second sequence of images captured by the population of sensor blocks;
   for each image in the second sequence of images:
      extracting a second set of features from the image;
      detecting a reference object in the image based on the second set of features;
      detecting a constellation of objects in the image based on the second set of features;
      deriving a location and an object type of each object in the constellation of objects based on the second set of features; and
   deriving a frequency of the constellation of objects occurring within the threshold distance of the reference object; and
   in response to the frequency of the constellation of objects occurring within the threshold distance of the reference object exceeding a threshold frequency:
      defining the anchor object type according to an object type of the reference object;
      defining a first cluster of objects in the constellation of objects as the set of inclusion objects;
      defining a second cluster of objects excluded from the constellation of objects as the set of exclusion objects; and
      defining the nominal condition of the space according to the anchor object type, the set of inclusion objects, and the set of exclusion objects.

3. The method of claim 1:
wherein accessing the corpus of object lists comprises accessing the corpus of object lists generated based on images captured by the population of sensor blocks arranged in the space comprising a work area containing the first location; and
wherein accessing the nominal condition of the space comprises retrieving the nominal condition assigned to the work area and stored in a nominal condition database.

4. The method of claim 1:
wherein accessing the nominal condition comprises receiving the nominal condition associated with a time window for detecting the nominal condition within the space comprising a work area; and
further comprising during a third time period succeeding the second time period, at the remote computer system:
   in response to detecting a second subset of objects, in the second set of objects, within the threshold distance of the anchor object type in the map and in response to the second time period intersecting the time window:
      detecting the second subset of objects, in the second set of objects, deviating from the set of inclusion objects and the set of exclusion objects of the nominal condition; and
      identifying the second subset of objects, in the second set of objects, as anomalous in a second location in the map;
   deriving a deviation frequency of the first subset of objects and the second subset of objects deviating from the set of inclusion objects and the set of exclusion objects; and
   in response to the deviation frequency exceeding a frequency threshold:
      generating a prompt for a user to revise the time window for detecting the nominal condition within the work area; and
      serving the prompt to a user.

5. The method of claim 1:
further comprising, at the remote computer system, prompting a user to define the nominal condition for the space comprising a conference room;
wherein accessing the nominal condition comprises receiving the nominal condition:
  defining the anchor object type comprising a table object for the conference room; and
  defining the set of inclusion objects and the set of exclusion objects for the conference room;
wherein detecting the anchor object type in the map comprises detecting the table object for the conference room in the map;
wherein identifying the subset of objects as anomalous comprises identifying the first object as anomalous in the first location within the conference room; and
wherein generating the notification comprises populating the notification with a prompt to investigate the conference room for the subset of objects.

6. The method of claim 1:
further comprising, at the remote computer system, prompting a user to define the nominal condition for the work area comprising a workstation;
wherein accessing the nominal condition comprises receiving the nominal condition:
  defining the anchor object type comprising a desk object for the workstation; and
  defining the set of inclusion objects and the set of exclusion objects for the workstation;
wherein detecting the anchor object type in the map comprises detecting the desk object for the workstation in the map.

7. The method of claim 1:
wherein accessing the nominal condition comprises accessing the nominal condition:
  associated with a reception area within the space;
  defining the anchor object type comprising a reception desk object;
  defining the set of inclusion objects within the threshold distance of the reception desk object; and
  defining the set of exclusion objects within the threshold distance of the reception desk object; and
wherein detecting the anchor object type in the map comprises detecting the reception desk object for the reception area in the map.

8. The method of claim 1:
further comprising, at the remote computer system, receiving a digital floor plan of the space;
wherein compiling locations of the second set of objects represented in the corpus of object lists into the map comprises:
  retrieving graphical representations of object types from a template graphical representation database; and
  superimposing graphical representations of object types of the second set of objects onto the floor plan of the space based on locations of the second set of objects to generate the map of the space.

9. The method of claim 1:
wherein accessing the nominal condition of the space comprises accessing the nominal condition:
  associated with a workstation within the space;
  defining the anchor object type comprising a desk object for the workstation;
  assigned a nominal cleanliness quality for the workstation; and
  assigned a time window, after working hours, for cleanliness verification of the workstation;
wherein detecting the anchor object type in the map comprises detecting the desk object for the workstation in the map;
further comprising, in response to the second time period intersecting the time window, deriving a cleanliness quality of the workstation based on the subset of objects;
wherein identifying the subset of objects, proximal the first location in the map, as anomalous comprises in response to the nominal cleanliness quality exceeding the cleanliness quality of the workstation, identifying the subset of objects, proximal the first location in the map, as anomalous; and
wherein generating the notification to investigate the first location for the subset of objects comprises generating a recommendation to remove the subset of objects from the first location to clean the workstation.

10. The method of claim 9:
wherein detecting the subset of objects, in the second set of objects, within the threshold distance of the anchor object type comprises detecting the subset of objects comprising paper objects, in the second set of objects, within the threshold distance of the desk object;
wherein deriving the cleanliness quality of the workstation comprises, in response to the second time period intersecting the time window, deriving the cleanliness quality of the workstation based on paper objects within the threshold distance of the desk object;
wherein identifying the subset of objects, proximal the first location in the map, as anomalous comprises identifying paper objects, proximal the first location in the map, as anomalous; and
wherein generating the notification to investigate the first location comprises generating a recommendation to remove paper objects from the workstation at the first location.

11. The method of claim 1:
wherein accessing the nominal condition of the space comprises retrieving the nominal condition:
  associated with a conference room within the space;
  defining the anchor object type comprising a table object and a target quantity of objects within the threshold distance of the table object for the conference room;
wherein detecting the anchor object type in the map comprises detecting the table object for the conference room in the map;
wherein identifying the subset of objects, proximal the first location in the map, as anomalous comprises:
  calculating a total quantity of the subset of objects in the map; and
  in response to the total quantity of the subset of objects exceeding the target quantity of objects defined in the nominal condition, identifying the subset of objects, in the second set of objects, as anomalous in the first location associated with the conference room in the map; and
wherein generating the notification to investigate the first location comprises generating the notification comprising a recommendation to reduce the total quantity of the subset of objects to the target quantity of objects in the first location.

12. The method of claim 11:
wherein detecting the subset of objects, in the second set of objects, within the threshold distance of the anchor object type comprises detecting the subset of objects comprising chair objects, in the second set of objects, within the threshold distance of the table object;
wherein identifying the subset of objects, proximal the first location in the map, as anomalous comprises calculating the total quantity of the chair objects in the map; and
wherein generating the notification to investigate the first location comprises generating a recommendation to reduce the total quantity of chair objects to the target quantity of objects.

13. The method of claim 1:
wherein accessing the nominal condition of the space comprises retrieving the nominal condition:
    associated with a conference room within the space;
    defining the anchor object type comprising a table object and a target quantity of objects within the threshold distance of the table object for the conference room;
wherein detecting the anchor object type in the map comprises detecting the table object for the conference room in the map;
wherein identifying the subset of objects, proximal the first location in the map, as anomalous comprises:
    calculating a total quantity of the subset of objects comprising human object types in the map; and
    in response to the total quantity of the human object types exceeding the target quantity of objects defined in the nominal condition, identifying human object types, in the second set of objects, as anomalous in the first location associated with the conference room in the map; and
wherein generating the notification to investigate the first location comprises generating the notification comprising a recommendation to reduce the total quantity of human object types to the target quantity of objects.

14. The method of claim 1:
wherein compiling locations of the second set of objects represented in the corpus of object lists into the map of the space comprises generating a visualization of the second set of objects in the space based on:
    known locations of the population of sensor blocks; and
    locations of the second set of objects extracted from the corpus of object lists; and
further comprising, at the remote computer system:
    retrieving graphical representations of object types from a template graphical representation database; and
    projecting graphical representations of object types of the second set of objects onto the visualization of the second set of objects in the space.

15. The method of claim 14, further comprising:
flagging graphical representations of the subset of objects, proximal the first location, in the map; and
prompting a user to annotate the subset of objects with object types in the map to verify graphical representations of the subset of objects in the map.

16. A method for detecting conditions within a space comprising:
at a first sensor block, in a population of sensor blocks, arranged in the space:
    capturing a first image via a first optical sensor arranged in the first sensor block;
    extracting a first set of features from the first image; and
    based on the first set of features:
        detecting a first set of objects in a first field of view of the first sensor block during the first time period; and
        deriving a location and an object type of each object in the first set of objects; and
    compiling locations and object types of the first set of objects into a first object list; and
at a remote computer system:
    receiving a nominal condition for a work area within the space, the nominal condition defining a set of inclusion objects within a threshold distance of an anchor object type for the work area;
    accessing a corpus of object lists, the corpus of object lists comprising the first object list and generated based on images captured by the population of sensor blocks;
    compiling locations of a second set of objects represented in the corpus of object lists into a map of the space based on known locations of the population of sensor blocks;
    retrieving graphical representations of object types from a template graphical representation database;
    populating the map of the space with graphical representations of object types of the second set of objects;
    identifying the anchor object type in the map; and
    in response to detecting a subset of objects, in the second set of objects, within the threshold distance of the anchor object type in the map and deviating from the set of inclusion objects:
        identifying the subset of objects as anomalous; and
        generating a notification to investigate the subset of objects within the work area.

17. The method of claim 16:
wherein retrieving graphical representations of object types comprises retrieving graphical icons representing object types from a template graphical icon database; and
wherein populating the map of the space with graphical representations of object types of the second set of objects comprises populating the map of the space with graphical icons of object types of the second set of objects.

18. The method of claim 17, further comprising, at the remote computer system:
receiving a second nominal condition for the work area within the space, the second nominal condition defining:
    a second set of inclusion objects within the threshold distance of a second anchor object type for the work area; and
    a set of exclusion objects within the threshold distance of the second anchor object type for the work area;
detecting the second anchor object type in the map; and
in response to detecting a second subset of objects, in the second set of objects, within the threshold distance of the second anchor object type in the map and deviating from the second set of inclusion objects and the set of exclusion objects:
    identifying the second subset of objects as anomalous in a second location within the map;
    generating a second notification to investigate the second location for the second subset of objects; and
    transmitting the second notification and the map to a user.

19. The method of claim 16:
wherein receiving the nominal condition for the work area comprises receiving the nominal condition for the work area comprising a lounge area within the space, the nominal condition defining:
- the anchor type object comprising a table object; and
- the set of inclusion objects within the threshold distance of the table object; and wherein detecting the anchor object type in the map comprises detecting the table object in the map.

20. A method for detecting conditions within a space comprising:
- at a first sensor block, in a population of sensor blocks, arranged in the space:
  - capturing a first image via a first optical sensor arranged in the first sensor block;
  - extracting a first set of features from the first image; and
  - based on the first set of features:
    - detecting a first set of objects in a first field of view of the first sensor block during the first time period; and
    - deriving a location and an object type of each object in the first set of objects; and
  - compiling locations and object types of the first set of objects into a first object list; and
- at a remote computer system:
  - receiving a corpus of object lists, the corpus of object lists comprising the first object list and generated based on images captured by the population of sensor blocks;
  - compiling locations of a second set of objects represented in the corpus of object lists into a map of the space based on known locations of the population of sensor blocks;
  - accessing a nominal condition of the space:
    - defining an anchor object type; and
    - defining a target quantity of objects within a threshold distance of the anchor object type;
  - identifying the anchor object type in the map;
  - calculating a total quantity of objects within the threshold distance of the anchor object type in the map; and
  - in response to the total quantity of objects exceeding the target quantity of objects defined in the nominal condition:
    - identifying an anomaly in a first location within the space; and
    - generating a notification to investigate the first location for the anomaly.

* * * * *